United States Patent
Parker et al.

(10) Patent No.: US 11,912,191 B2
(45) Date of Patent: Feb. 27, 2024

(54) KITCHEN MODULE FOR A VEHICLE

(71) Applicant: Rivian IP Holdings, LLC, Plymouth, MI (US)

(72) Inventors: Larry Parker, Bloomfield Hills, MI (US); Elizabeth Steenwyk, Detroit, MI (US); Christian Elder, Sylvan Lake, MI (US); Arthur Bledsoe, Detroit, MI (US); Ruey-Khan Tsang, Ann Arbor, MI (US); Kaitlyn Benoit, Detroit, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 361 days.

(21) Appl. No.: 16/877,179

(22) Filed: May 18, 2020

(65) Prior Publication Data
US 2020/0361360 A1    Nov. 19, 2020

Related U.S. Application Data

(60) Provisional application No. 62/849,114, filed on May 16, 2019.

(51) Int. Cl.
*B60P 3/34* (2006.01)
*B60P 3/36* (2006.01)
(Continued)

(52) U.S. Cl.
CPC .............. *B60P 3/34* (2013.01); *B60P 3/36* (2013.01); *B60R 7/02* (2013.01);
(Continued)

(58) Field of Classification Search
CPC ..... B60P 3/34; B60P 3/36; B60R 7/02; B60R 2011/0024; B60R 2011/0043;
(Continued)

(56) References Cited

U.S. PATENT DOCUMENTS 4,917,430 A * 4/1990 Lawrence ................ B60R 9/02
224/281
5,615,922 A    4/1997 Blanchard
(Continued)

FOREIGN PATENT DOCUMENTS

CN    102180120 A    9/2011
CN    202703385 U    1/2013
(Continued)

OTHER PUBLICATIONS

Robert Annis: "Scout Overland Kitchen I Outside Online", Jul. 29, 2016 (Jul. 29, 2016), Retrieved from the Internet: URL:https://www.outsideonline.com/2099751/scout-overland-kitchen [retrieved on Aug. 18, 2020] (1 page).
(Continued)

*Primary Examiner* — Pinel E Romain
(74) *Attorney, Agent, or Firm* — Haley Guiliano LLP

(57) ABSTRACT

A kitchen module for a vehicle includes a frame system for providing structural support, a rail system affixed to the frame system and the vehicle, and a plurality of kitchen components mounted to the frame system. The rail system is configured to allow the frame system to move relative to the vehicle. The plurality of kitchen components include a sink, a potable water tank, a waste-water tank, a rangetop, at least one drawer, a countertop, lights, any other suitable component, or any combination thereof. The vehicle, which may be an electric vehicle having a battery module, can include an electrical extension connecting an electric power source of the vehicle to the kitchen module. The electrical extension may be coupled to at least one of an actuator of the rail system and a rangetop.

20 Claims, 17 Drawing Sheets

(51) Int. Cl.
*B60R 7/02* (2006.01)
*B60R 11/00* (2006.01)

(52) U.S. Cl.
CPC ................ *B60R 2011/0024* (2013.01); *B60R 2011/0043* (2013.01); *B60R 2011/0082* (2013.01); *B60R 2011/0084* (2013.01)

(58) Field of Classification Search
CPC .... B60R 2011/0082; B60R 2011/0084; B60N 3/16; B60L 1/00
USPC ............................... 296/24.34, 190.02, 37.6
See application file for complete search history.

(56) References Cited

U.S. PATENT DOCUMENTS

| | | | | |
|---|---|---|---|---|
| 5,915,851 | A * | 6/1999 | Wattrick | A47B 77/022 |
| | | | | 4/631 |
| 6,254,160 | B1 * | 7/2001 | Marriott | B60N 3/102 |
| | | | | 126/39 B |
| 6,672,637 | B2 | 1/2004 | Hutzel | B62D 47/003 |
| | | | | 296/3 |
| 6,814,383 | B2 * | 11/2004 | Reed, III | B60P 3/14 |
| | | | | 224/404 |
| 7,156,446 | B2 * | 1/2007 | Perakis | B60J 1/183 |
| | | | | 296/107.03 |
| 7,407,210 | B2 * | 8/2008 | Arbaugh | B60R 7/04 |
| | | | | 296/37.8 |
| 8,528,962 | B2 * | 9/2013 | Wilkie | B60P 3/36 |
| | | | | 296/26.14 |
| 8,919,850 | B2 * | 12/2014 | Quattrocolo | F24C 15/2092 |
| | | | | 296/190.02 |
| 10,183,608 | B2 * | 1/2019 | Knight | B60P 3/341 |
| 10,214,131 | B2 * | 2/2019 | Aplin | B60P 3/36 |
| 10,710,491 | B1 * | 7/2020 | Groover | B60P 3/34 |
| 10,899,282 | B2 * | 1/2021 | Aplin | B60P 3/36 |
| 11,230,218 | B2 * | 1/2022 | Chevalier | B60P 3/36 |
| 11,345,287 | B2 * | 5/2022 | Aldrich | B60R 11/00 |
| 2005/0134070 | A1 * | 6/2005 | Plentis | B60R 9/02 |
| | | | | 296/37.1 |
| 2006/0192468 | A1 * | 8/2006 | Gardner | A47B 77/04 |
| | | | | 312/236 |
| 2008/0191506 | A1 * | 8/2008 | Huotari | A47B 37/00 |
| | | | | 224/404 |
| 2015/0034580 | A1 * | 2/2015 | Hofvander | B60R 7/08 |
| | | | | 211/87.01 |
| 2016/0325671 | A1 * | 11/2016 | White | A47B 77/02 |
| 2018/0027960 | A1 * | 2/2018 | Dressler | B60P 3/36 |
| 2020/0317111 | A1 * | 10/2020 | Mundt | B60P 3/34 |
| 2021/0086702 | A1 * | 3/2021 | Christensen | B60R 3/02 |

FOREIGN PATENT DOCUMENTS

| | | | |
|---|---|---|---|
| CN | 205916022 U | 2/2017 | |
| CN | 207225188 U | 4/2018 | |
| CN | 108 973 837 | 11/2018 | |
| CN | 108973837 A | * 12/2018 | ............... B60P 3/36 |
| DE | 86 27 974 | 2/1987 | |
| DE | 86 33 925 | 2/1987 | |
| DE | 10 216 200198 | 7/2017 | |
| EP | 3424776 A1 | 1/2019 | |
| FR | 2 632 583 | 12/1989 | |
| GB | 0523333 A | 7/1940 | |
| GB | 1308825 A | 3/1973 | |
| GB | 2451126 A | 1/2009 | |
| GB | 2559191 A | 8/2018 | |
| JP | 2004-058712 A | 2/2004 | |
| JP | 2004-249953 A | 9/2004 | |
| KR | 10-1566761 B1 | 11/2015 | |
| WO | WO 2018234979 | 12/2018 | |

OTHER PUBLICATIONS

International Search Report and Written Opinion of PCT/US2020/033462 dated Aug. 26, 2020.

* cited by examiner

KITCHEN MODULE FOR A VEHICLE

CROSS-REFERENCE TO RELATED APPLICATION

This application claims the benefit of U.S. Provisional Patent Application No. 62/849,114 filed May 16, 2019, the disclosure of which is hereby incorporated by reference herein in its entirety.

INTRODUCTION

The present disclosure is directed towards a kitchen module for a vehicle, and more particularly towards a kitchen module that is accessible from storage of vehicle.

Vehicles used for off-road and sporting purposes may serve as transportation, provide shelter, and provide accessories for recreation. Some vehicle include storage such as truck beds, SUV cargo areas, or even rooftop storage systems. It would be advantageous for a vehicle to include integrated, compact accessories for travel.

SUMMARY

In some embodiments, the present disclosure is directed to a kitchen module for a vehicle. The kitchen module includes a frame system and a plurality of kitchen components. The frame system provides structural support. In some embodiments, a rail system is affixed to the frame system and the vehicle, and is configured to allow the frame system to move relative to the vehicle. The plurality of kitchen components are mounted to the frame system. For example, the plurality of kitchen components may be any of a sink, a potable water tank, a rangetop, at least one drawer, a countertop, any other suitable components, or any combination thereof. For example, in some embodiments, the sink is coupled by a plumbing system to a potable water tank. In a further example, in some embodiments, the rangetop is an induction rangetop. In a further example, in some embodiments, the at least one drawer includes an end drawer arranged between rails of the rail system. In a further example, in some embodiments, the countertop includes at least one section that is removable. In a further example, in some embodiments, the countertop includes at least two parts coupled by a hinge that can rotate relative to one another. In a further example, in some embodiments, the at least one drawer includes a recess to accommodate another component. In a further example, in some embodiments, the rail system includes rail members arranged to slide relative to each other, thus allowing axial motion of the frame system relative to the vehicle. In some embodiments, the kitchen module has a tapered or slanted cross-section, when collapsed or stowed, to fit between a rear seat and cargo compartment or bed.

In some embodiments, the present disclosure is directed to a vehicle having a storage compartment and a kitchen module. The kitchen module includes a frame system for providing structural support, a rail system affixed to the frame system and the vehicle, and a plurality of kitchen components mounted to the frame system. The rail system is configured to allow the frame system to move relative to the vehicle. The rail system is affixed to a surface of the storage compartment, and the kitchen module is arranged to be extended from and retracted into the storage compartment. In some embodiments, the vehicle includes an electrical extension connecting an electric power source of the vehicle to the kitchen module. In some embodiments, the vehicle is an electric vehicle and the electric power source of the vehicle includes a battery module that also provides power to an electric drivetrain of the vehicle. In some embodiments, the electrical extension is coupled to at least one of an actuator of the rail system and a rangetop.

In some embodiments, the vehicle includes an air compression extension connecting an air compressor system of the vehicle to the kitchen module.

In some embodiments, the vehicle includes an outer panel that is arranged to be part of the vehicle exterior when the kitchen module is retracted into the storage compartment.

In some embodiments, the vehicle includes an occupant compartment and a cargo bed. In some such embodiments, the storage compartment is arranged between an occupant compartment and a carbo bed.

In some embodiments, the kitchen module includes at least one of a sink, a potable water tank, a rangetop, at least one drawer, or a countertop. In some embodiments, the kitchen module includes a sink and a portable water tank, and the sink is coupled by a plumbing system to the potable water tank. In some embodiments, the kitchen module includes a countertop that folds out to form a horizontal surface. In some embodiments, the kitchen module includes an exterior body surface comprising an opening, wherein the storage compartment is within the opening.

In some embodiments, the present disclosure is directed to a modular kitchen system for a vehicle. The modular kitchen system may include two or more submodules that are usable together to form the modular kitchen system. For example, the submodules may include one or more of a sink submodule, a rangetop submodule, and a cooler or refrigerator submodule. In some embodiments, the modular kitchen system comprises a shuttle system, on which the submodules can be mounted and secured.

In some embodiments, the present disclosure is directed to a shuttle system that can be extended from either side of a vehicle. In some embodiments, the shuttle system can be extended from a lateral storage compartment that includes covers on both sides of the vehicle. In some embodiments, the shuttle system may include a release mechanism and handle on each side such that it may be pulled and retracted from either side. In some embodiments, the shuttle system comprises a two-way rail system that enables the shuttle system to extend out of both sides of the vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Figure 1:
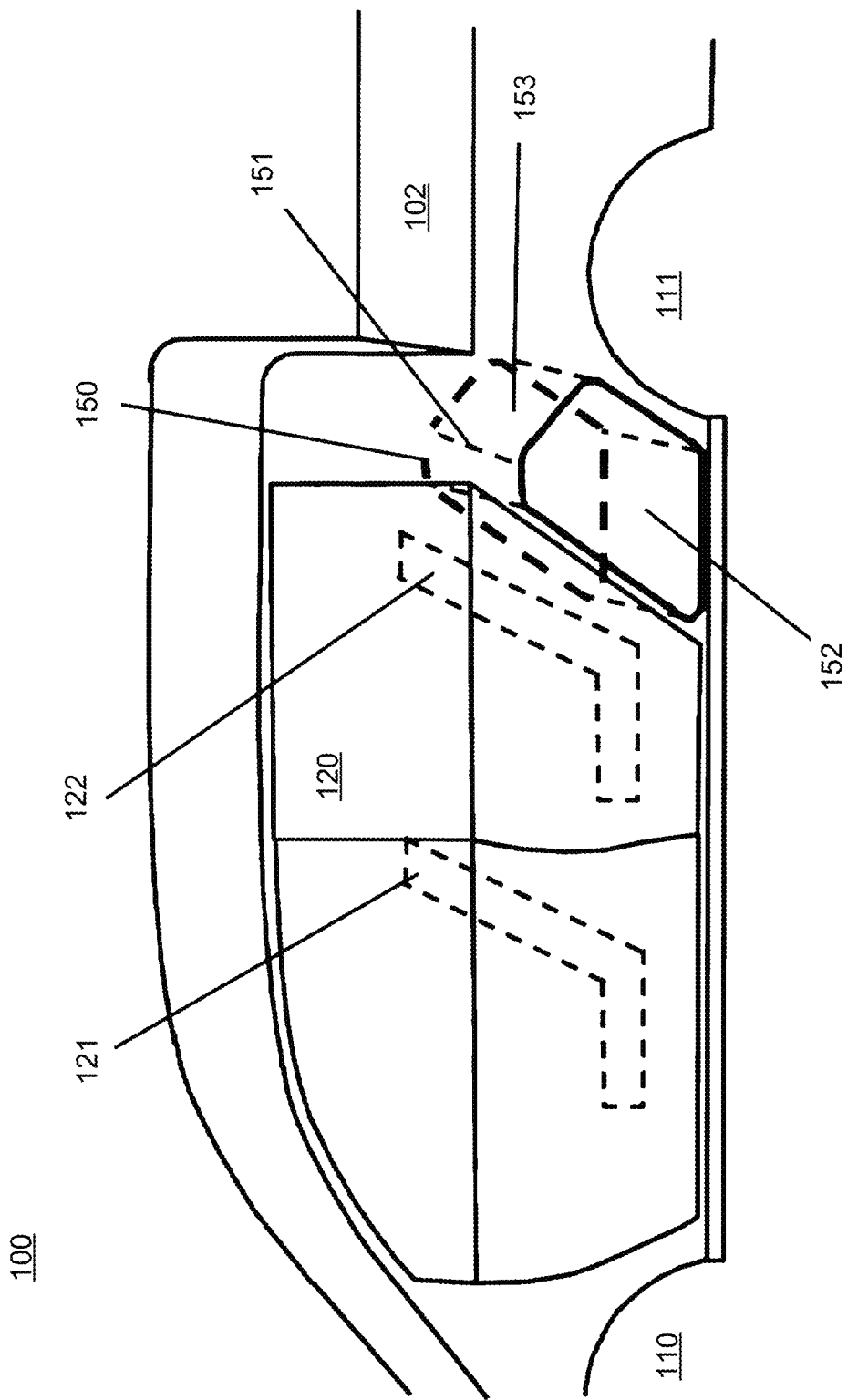
FIG. 1 shows a side view of a portion of an illustrative vehicle having a kitchen module, in accordance with some embodiments of the present disclosure.

FIG. 1 shows a side view of a portion of illustrative 100 vehicle having a kitchen module, in accordance with some embodiments of the present disclosure. Vehicle 100 includes storage compartment 150 having a volume and opening 152 to the exterior of vehicle 100. Storage compartment 150 has a profile shape (e.g., as viewed from the side of the vehicle) having sidewalls 153 and corner regions 151 generally corresponding to the shape of the opening at the vehicle exterior (e.g., behind passenger compartment 120 and in front of rear wheel well 111 and bed 102). As illustrated, storage compartment 150 is arranged behind passenger compartment 120 (e.g., having seats 121 and 122, and a dashboard with vehicle controls). Storage compartment 150 includes opening 152, which provides access to the kitchen module for a user. For example, the user may open a hatch or door at opening 150, and then pull out the kitchen module to the side of vehicle 100 to provide access of kitchen items to the user. In some embodiments, storage compartment 150 may have a first opening on the left side of the vehicle, and a second opening on the right side of the vehicle (e.g., opening 152 is one of the openings, with the other on the opposite side of vehicle 100).

In an illustrative example, a storage compartment (e.g., storage compartment 150) may include one or more sidewalls, which may be a continuous wall that is entirely curved in cross section, a continuous wall that includes both curved portions and straight portions in cross section, or a continuous wall with straight and/or curved portions in cross section with defined edges between sidewalls. For example, the sidewall(s) may be composed of several pieces of panel material assembled together. In a further example, if the sidewall is composed of several pieces, they may be connected together by welding, or with fasteners, or by glue, or using another means of connecting components. In some embodiments, the sidewalls may be made out of plastic, metal alloy such as steel sheet or aluminum alloy sheet or the like, composite materials, or other suitable material. In some embodiments, the storage compartment may be shaped in cross section in a substantially rectangular shape (e.g., a square shape). In some embodiments, the storage compartment is shaped in cross section in an asymmetric shape (e.g., a polygon shape with no right angles between one sidewall portion and an adjacent sidewall portion and with one sidewall that is longer in cross section than the rest of the sidewalls). For example, as illustrated, the front sidewall includes a straight portion that is angled towards the back of the vehicle. The rear sidewall includes two straight portions, where the lower straight portion is angled towards the back of the vehicle and the upper straight portion is angled towards the front of the vehicle. In some embodiments, this asymmetric shape increases or maximizes the volume of the storage compartment between the rear seat 122, rear wheel well 111, and the bed of the vehicle. For example, as illustrated the bottom front portion of the storage compartment extends under the seatback of rear seat 122 and the rearmost portion of the storage compartment extends above a portion of rear wheel well 111.

Figure 2:
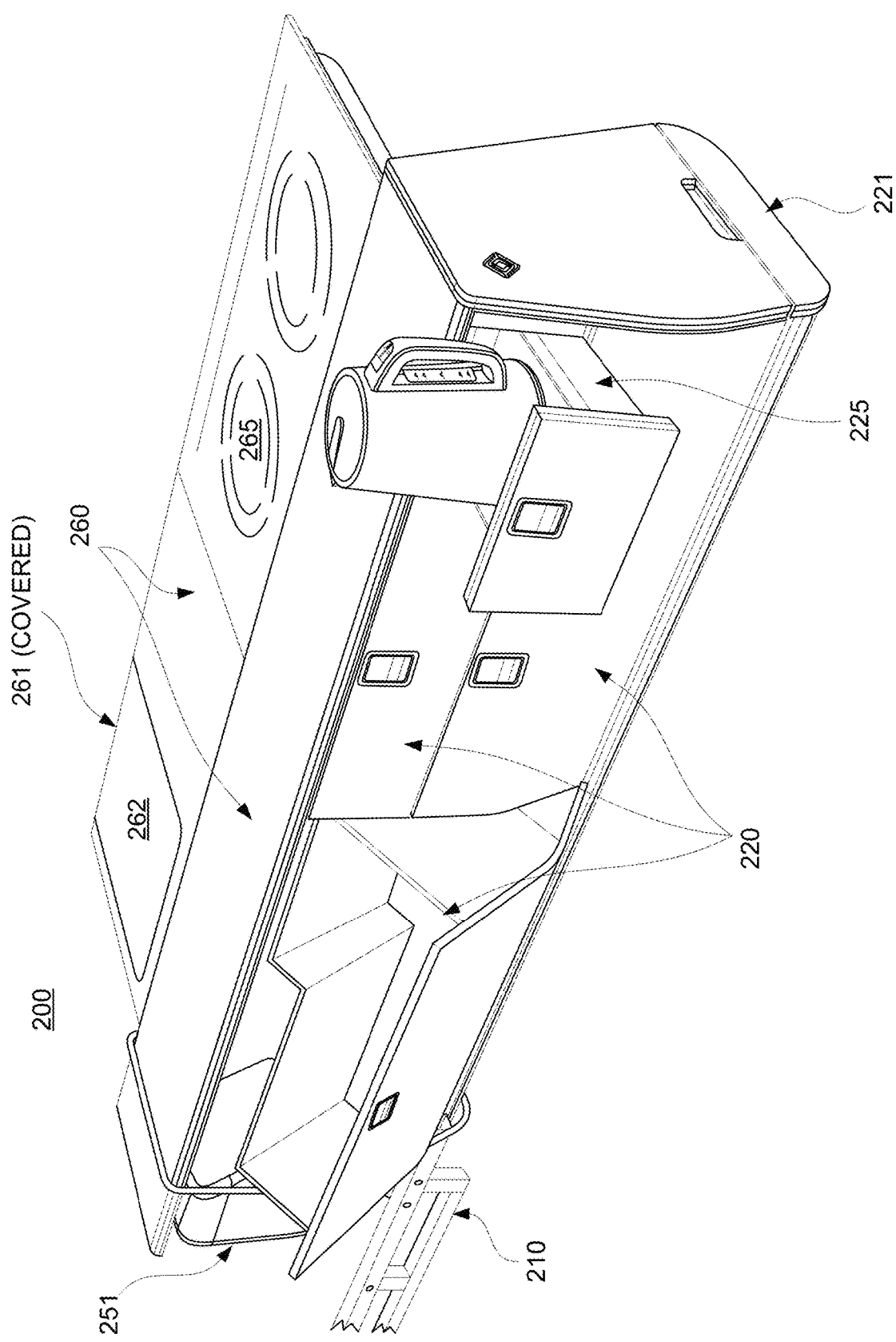
FIG. 2 shows a side perspective view of an illustrative kitchen module, pulled out from a storage compartment of a vehicle, in accordance with some embodiments of the present disclosure.

FIG. 2 shows a side perspective view of illustrative kitchen module 200, pulled out from a storage compartment of a vehicle (not shown in FIG. 2), in accordance with some embodiments of the present disclosure. Kitchen module 200 includes rail system 210 that affixes to the vehicle, within the storage compartment, allowing a linear motion of kitchen module 200. In some embodiments, kitchen module 200 is an after-market accessory and rail system 210 that can be mounted to hard points in the storage component (e.g., via bolts). In some embodiments, kitchen module 200 is a factory-installed option. A user may pull out kitchen module 200 from the storage compartment, through the opening, by applying a force on kitchen module 200 such that it slides or rolls along rail system 210. Kitchen module 200, as illustrated, includes water tank 251 (e.g., potable water, waste water, or multiple tanks for each), plumbing corresponding to water tank 251, countertop 260, sink 261 (e.g., arranged in countertop 260 below removable cover 262, as illustrated), rangetop 265 (e.g., arranged in countertop 260 for heating pans, as illustrated), and a plurality of drawers 220 (e.g., including end drawer 221, and electric kettle drawer 225), along with any other suitable components of the present disclosure. As illustrated, countertop 260 is two-part, wherein the rear part (e.g., including sink 261 and rangetop 265) is configured to fold down to fit through the opening in the vehicle. In some embodiments, kitchen module 200 may include a leg or a stand configured to support at least some weight of kitchen module 200 (e.g., when extended).

Kitchen module 200 may include any suitable shape, in accordance with the present disclosure. For example, in some embodiments, as illustrated, kitchen module 200 is tapered, narrowing at the top and widening at the bottom to fit in a corresponding storage compartment (e.g., to maximize use of the space between a cargo bed and rear seat). In a further example, in some embodiments, kitchen module 200 may be slanted, having a fixed width but following a slanted or curved path (e.g., slanted or curved from vertical in the front-back axis of the vehicle) to fit in a corresponding storage compartment (e.g., to maximize use of the space between a cargo bed and rear seat). A kitchen module (e.g., kitchen module 200) may include any suitable cross-sectional shape, in accordance with the present disclosure.

Figure 3:
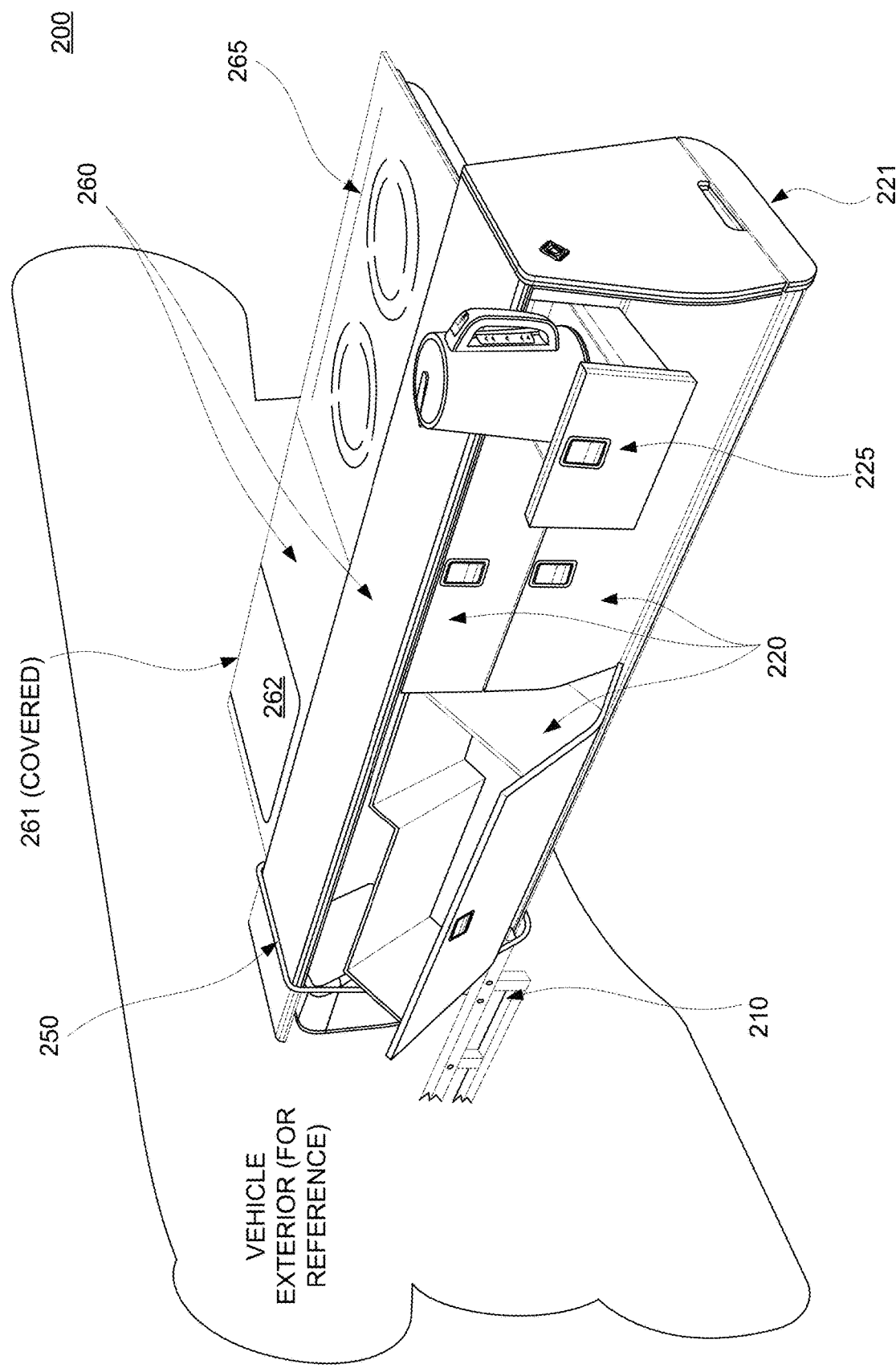
FIG. 3 shows a side perspective view of the illustrative kitchen module of FIG. 2, with a drawer opened, in accordance with some embodiments of the present disclosure.

FIG. 3 shows a side perspective view of illustrative kitchen module 200 of FIG. 2, with a drawer opened, in accordance with some embodiments of the present disclosure. FIG. 3 also shows some of the vehicle exterior for reference, and indicates opening 250, from which kitchen module 200 may be accessed.

Figure 4:
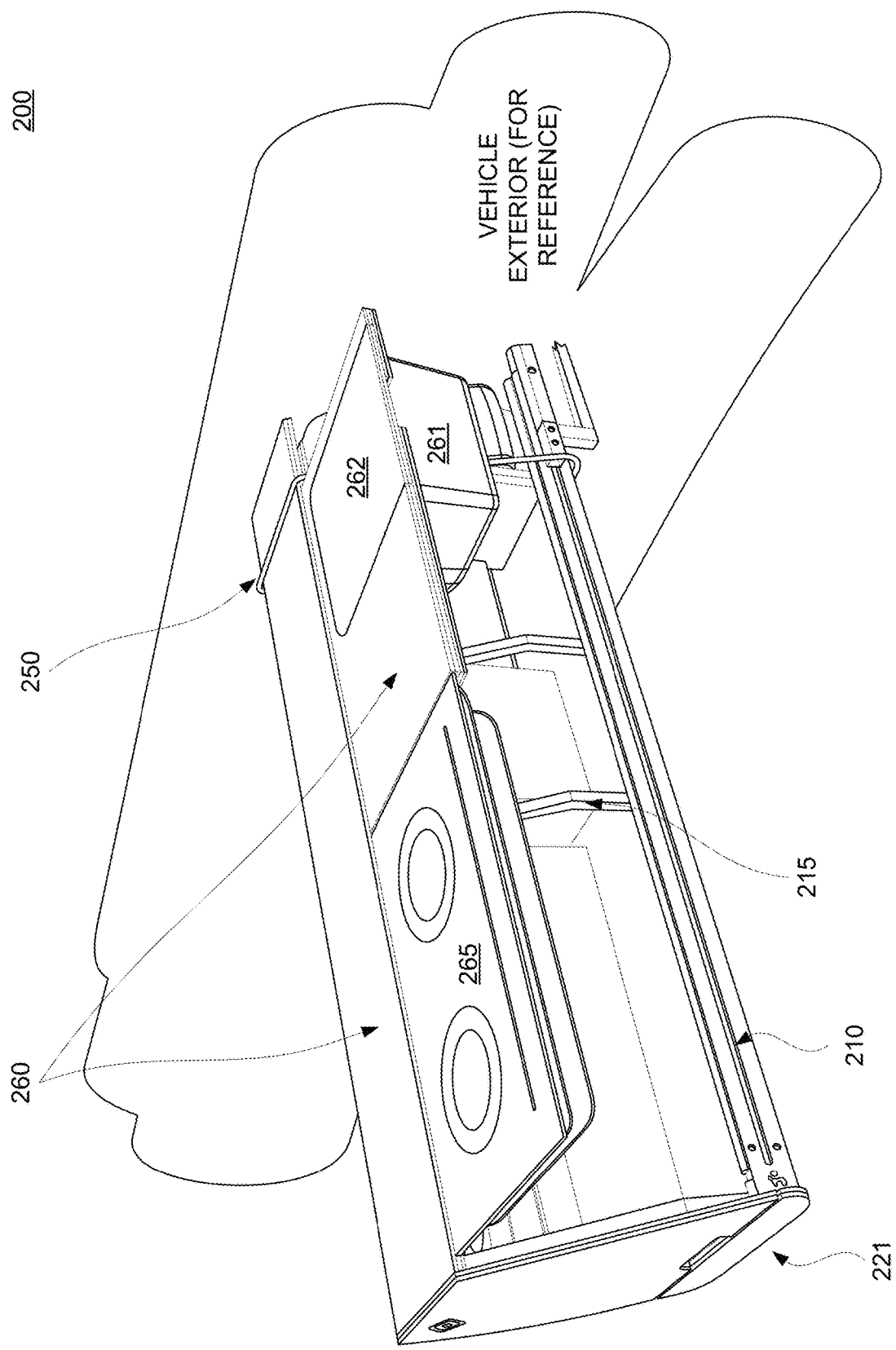
FIG. 4 shows a side perspective view (from the opposite side as FIG. 3) of the illustrative kitchen module of FIGS. 2-3, in accordance with some embodiments of the present disclosure.

FIG. 4 shows a side perspective view (from the opposite side as FIG. 3) of kitchen module 200 of FIGS. 2-3, in accordance with some embodiments of the present disclosure. FIG. 4 also shows some of the vehicle exterior for reference, and indicates opening 250, from which kitchen module 200 may be accessed. Frame system 215 is illustrated in FIG. 4, which forms the structural support for the components of kitchen module 200. In an illustrative example, sink 261 may be collapsible, folding down into a recess (e.g., to fit through opening 250 and to a storage compartment). Sink 261 may be rigid (e.g., a metal basin) and configured to fold down as a rigid body, flexible and capable of being compressed or folded itself to achieve a smaller volume (e.g., formed from plastic sheet or other flexible material), or a combination thereof.

Figure 5:
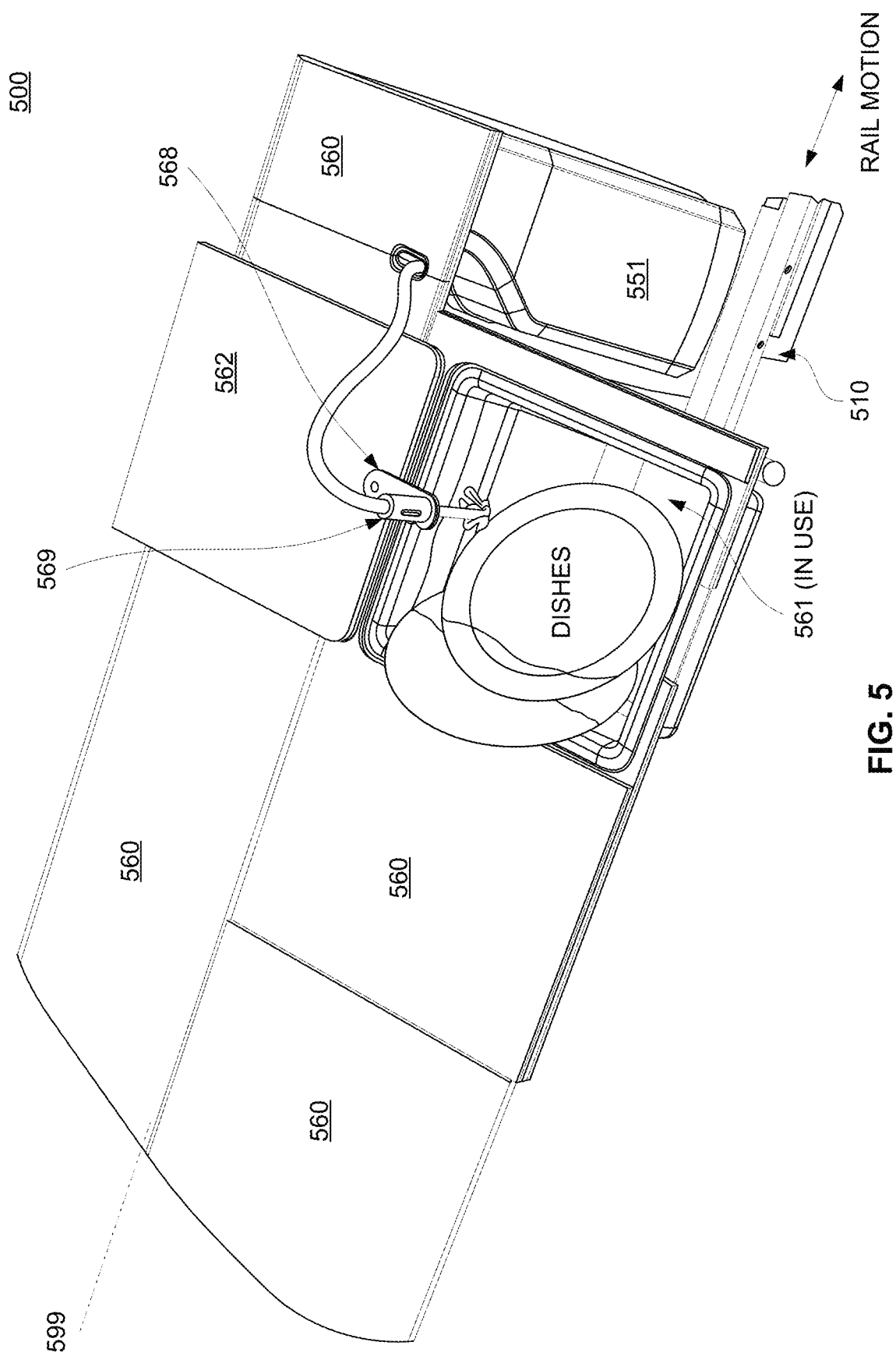
FIG. 5 shows a top perspective view of a portion of an illustrative kitchen module (similar to the kitchen module of FIGS. 2-4), pulled out from a storage compartment of a vehicle, in accordance with some embodiments of the present disclosure.

FIG. 5 shows a top perspective view of a portion of illustrative kitchen module 500 (e.g., similar to kitchen module 200 of FIGS. 2-4), pulled out from a storage compartment of a vehicle, in accordance with some embodiments of the present disclosure. As illustrated, kitchen module 500 includes countertop 260 having one or more countertop sections that are movable, removable, or both. For example, as illustrated, countertop section 562 is flipped back to reveal sink 561. As illustrated, countertop 560 is two-part as illustrated, and includes a hinge (not visible in FIG. 5) allowing the countertop to fold along hinge axis 599. Faucet 569 and associated plumbing (e.g., hosing, tubing, valves, filters, fittings), which is coupled to water tank 551, is affixed to sink 561 by bracket 568 and arranged to provide water to the sink basin (e.g., for washing dishes as illustrated). In some embodiments, faucet 569 and plumbing may be retractable, dis-connectable, or both. For example, faucet 569 can be disconnected from countertop 560 and a hose can be retracted through a slot in countertop 560 above water tank 551. The slot can be shaped to receive faucet 569 such that the underside of faucet 569 is visible when fully retracted. In some embodiments, the underside of faucet 569 is flush with the surface of countertop 560 when fully retracted. The sink basin of sink 561 may include a drain, but need not (e.g., sink 560 may be removable and can be "dumped"). In some embodiments, kitchen module 500 includes a waste-water tank coupled to the sink basin, wherein waste-water from the sink basin flows into the waste-water tank (e.g., for subsequent dumping or otherwise disposal). In some embodiments, kitchen module 500 includes a waste-water drain hose coupled to the sink basin to direct the waste-water to a desired location on the ground or a grate of a waste-water drain system in the ground.

Figure 6:
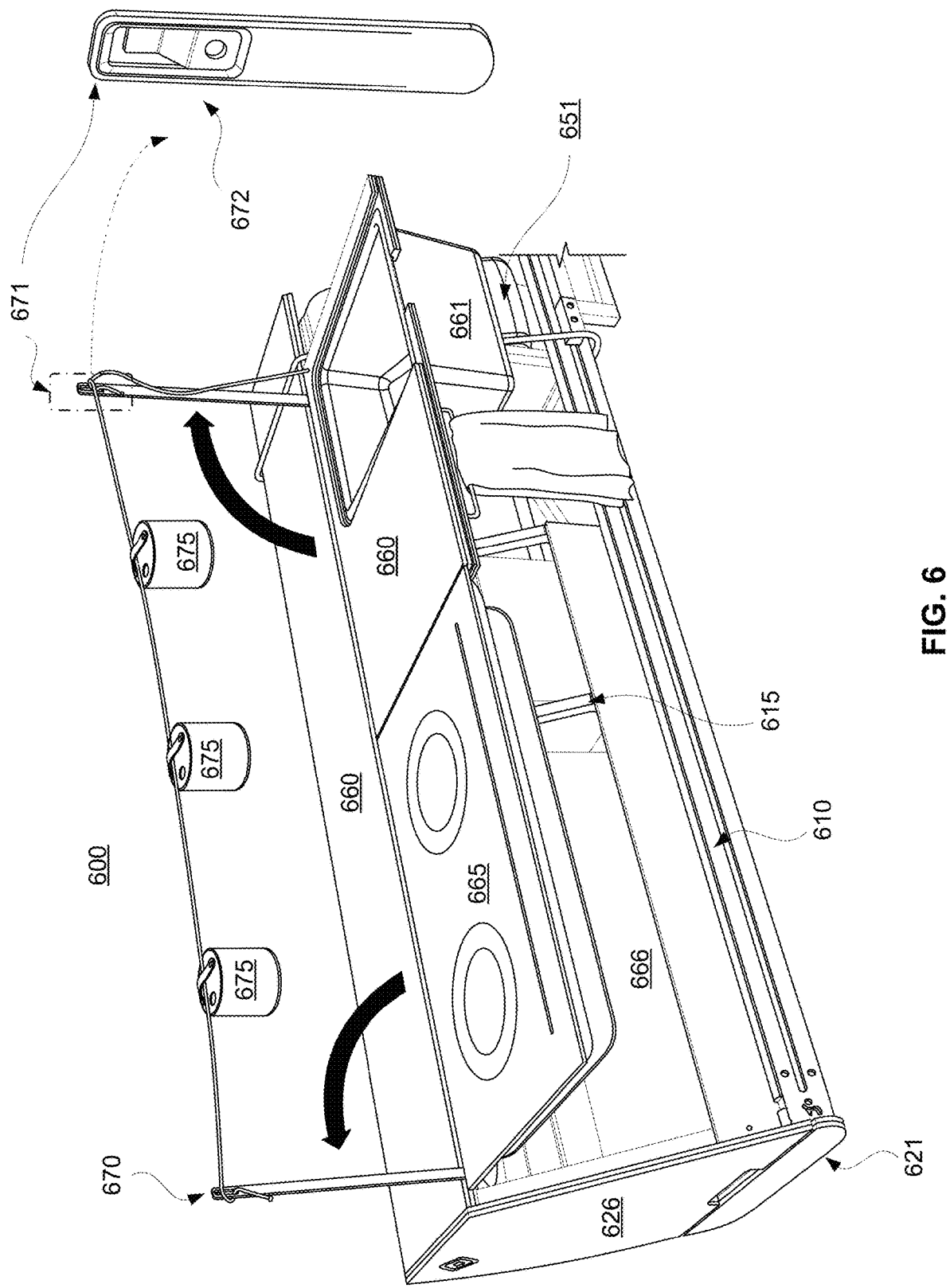
FIG. 6 shows a top perspective view of an illustrative kitchen module (similar to the kitchen module of FIGS. 2-5), with lights arranged over the countertop, in accordance with some embodiments of the present disclosure.

FIG. 6 shows a top perspective view of illustrative kitchen module 600 (e.g., similar to kitchen modules 200 and 500 of FIGS. 2-5), with lights 675 arranged over countertop 660, in accordance with some embodiments of the present disclosure. In some embodiments, a kitchen module includes light fixtures and bulbs arranged to illuminate the user-accessible surfaces of the kitchen module. For example, as illustrated, kitchen module 600 includes posts 670 and 671, which are configured to rotate into the illustrated position as shown by the curved, black arrows. Posts 670 and 671 are used to festoon lighting fixtures (e.g., lights 675) over countertop 660. For example, rope, twine, a chain, cable, electrical wire, or other suitable member may be used to suspend or otherwise hold the light fixtures. The lighting fixtures may be wired (e.g., powered by 12 VDC from the vehicle, 110 VAC from a DC-AC converter), battery powered, or both. An enlargement of post 671 is shown, illustrating features 672 that may be used in holding the lighting fixtures (e.g., features such as a hook, a hole, a ring). Rangetop 665 illustrated in FIG. 6 may be folded down against rangetop recess 666 for retraction of kitchen module 600 into the vehicle. In some embodiments, outer panel 626 includes a portion of the vehicle exterior (e.g., arranged above end drawer 621, as illustrated).

Figure 7:
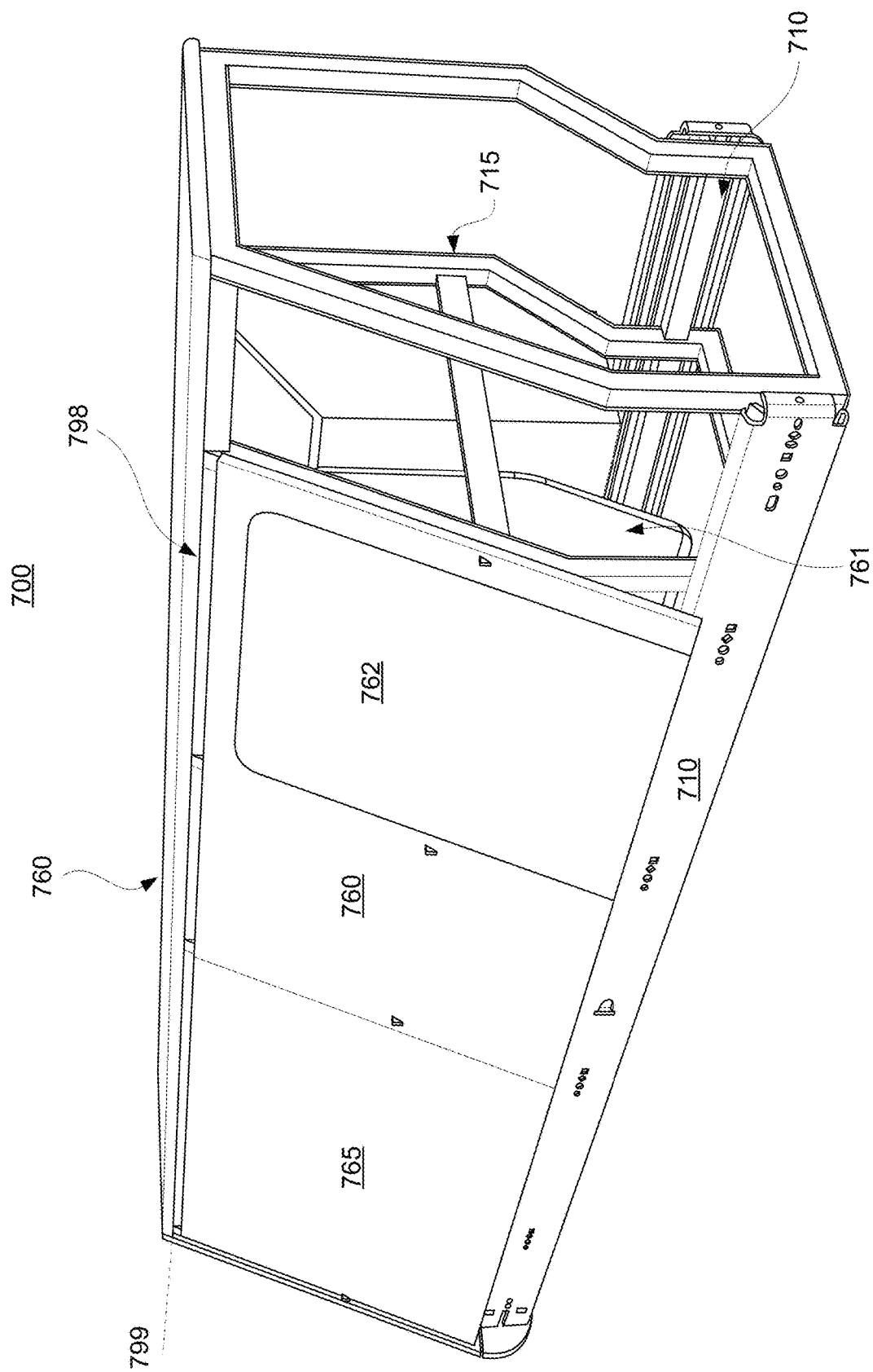
FIG. 7 shows a side perspective view of an illustrative kitchen module (similar to the kitchen module of FIGS. 2-6), retracted and folded down, in accordance with some embodiments of the present disclosure.

FIG. 7 shows a side perspective view of illustrative kitchen module 700 (e.g., similar to kitchen module 200, 500, and 600 of FIGS. 2-6), retracted and folded down, in accordance with some embodiments of the present disclosure. As illustrated in FIG. 7, when kitchen module 700 is retracted (e.g., in the storage compartment of the vehicle, not shown in FIG. 7), it is in a folded down configuration (e.g., providing compactness for storage). The folded down module may be pulled out and unfolded about hinge 798 (e.g., rotated about axis 799) to form the horizontal countertops 760 (e.g., including removable countertop section 762), rangetop 765, and sink 761 (e.g., becoming less compact but more functional). The components of kitchen module 700 may be mounted to frame system 715 (e.g., to provide structural rigidity), which is in turn mounted to the rail system 710 (e.g., to provide axial motion). As shown in FIG. 7, the front portion of kitchen module 700, in the folded down configuration, includes a relatively large flat surface that is angled backwards. In some embodiments, this angle is the same as the angle of the front side wall of the storage compartment (see, e.g., storage compartment 150 of FIG. 1). In some embodiments, the front portion of kitchen module 700, when retracted in the storage compartment, lies under the seatback of a rear seat of a vehicle.

Figure 8:
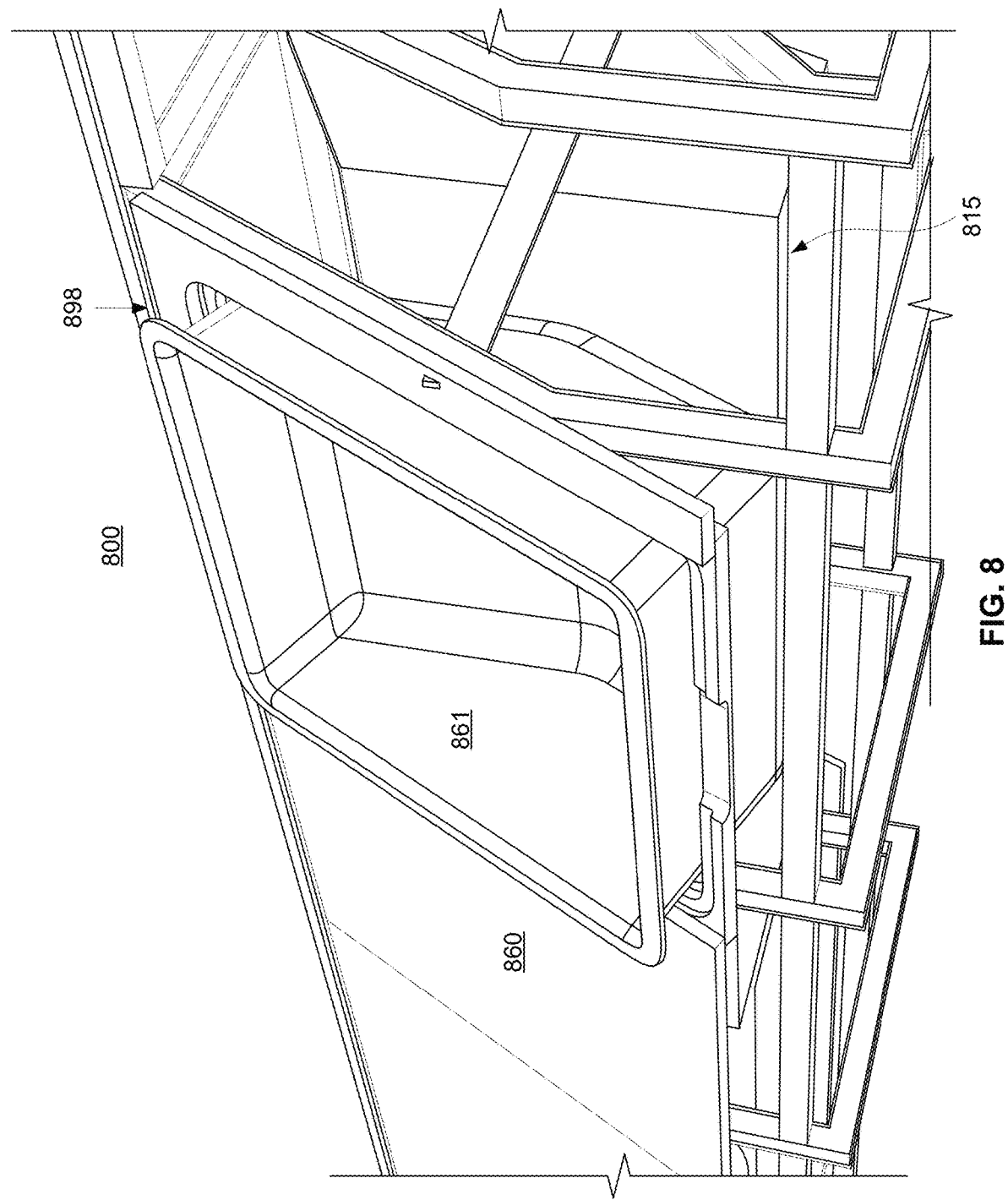
FIG. 8 shows a side perspective view of a portion of an illustrative kitchen module (similar to the kitchen module of FIGS. 2-7), pulled out and folded down, in accordance with some embodiments of the present disclosure.

FIG. 8 shows a side perspective view of a portion of illustrative kitchen module 800 (e.g., similar to kitchen modules 200, 500, 600, and 700 of FIGS. 2-7), pulled out and folded down, in accordance with some embodiments of the present disclosure. FIG. 8 shows removable sink 861 partially removed from a sink recess and the removeable countertop section above the sink removed. Frame system 815 maintains the position of, and constrains motion of, components of kitchen module 800 (e.g., such as countertop 860 and sink 861). Sink 861, when installed, and countertop 860 may be rotated to horizontal via hinge 898.

Figure 9:
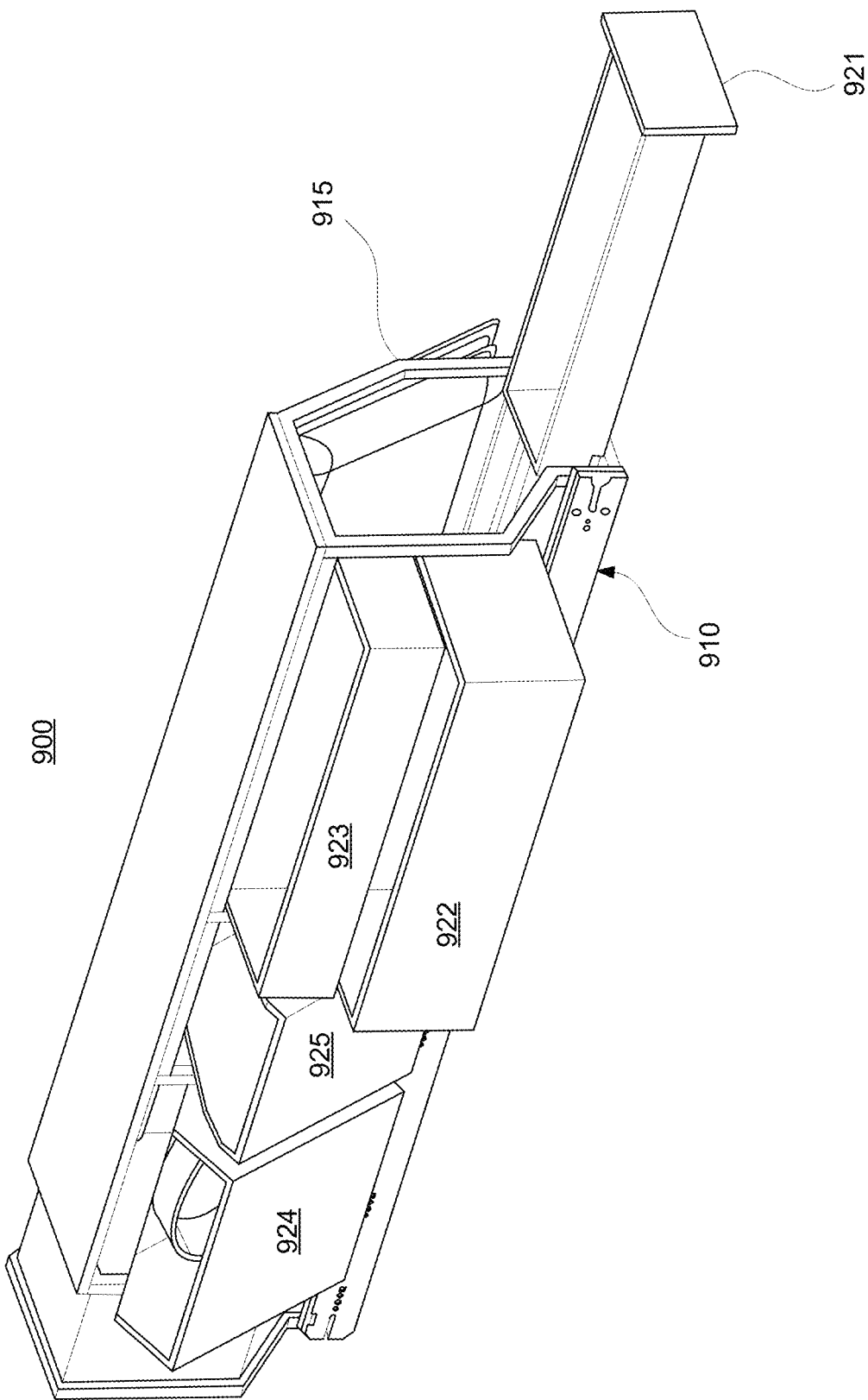
FIG. 9 shows a top perspective view of an illustrative kitchen module with all drawers in the extended state, in accordance with some embodiments of the present disclosure.

FIG. 9 shows a top perspective view of illustrative kitchen module 900 with all drawers (e.g. drawers 921-925) in the extended state, in accordance with some embodiments of the present disclosure. As illustrated, drawer 921 is an end drawer, drawers 924 and 925 are hinge-out drawers, and drawers 922 and 923 are pull-out drawers. As illustrated, sink 961 is collapsed down against frame system 915 to achieve a compact shape (e.g., to fit within a storage compartment). In some embodiments, as illustrated, sink 261 is rigid and configured to fold down as a rigid body. In some embodiments, sink 261 is flexible and capable of being compressed, folded, or rolled itself to achieve a smaller volume for storage when not in use (e.g., formed from plastic sheet or other flexible material).

Illustrative dimensions are provided herein to illustrate length scales that may be achieved in accordance with the present disclosure. It will be understood that a kitchen module, and drawers thereof, may include any suitable dimensions in accordance with the present disclosure.

In an illustrative example, drawer 921 may be 140 mm wide, 70 mm tall, and 615 mm deep, and may be arranged between rails of rail system 910 (e.g., to use the space between rails as storage). In a further illustrative example, drawer 921 may be configured to store pantry items, cleaning supplies, and any other suitable equipment, and may include one or more dividers to partition the volume within drawer 921.

In an illustrative example, drawer 922 may be 598 mm wide, 150 mm tall, and 230 mm deep. In a further illustrative example, drawer 922 may be configured to store cookware, short pots, pantry items, cleaning supplies, cutting boards, flatware, and any other suitable equipment, and may include one or more dividers to partition the volume within drawer 922.

In an illustrative example, drawer 923 may be 598 mm wide, 100 mm tall, and 185 mm deep. In a further illustrative example, drawer 923 may be configured to store cookware, utensils, spices, cleaning supplies, cutting boards, flatware, and any other suitable equipment, and may include one or more dividers to partition the volume within drawer 923.

In an illustrative example, drawer 924 may be 316 mm wide, 310 mm tall, and 160 mm deep. In a further illustrative example, drawer 924 may be configured to store pans, cast iron pots/pans, cutting boards, grilling/baking sheets, and any other suitable equipment, and may include one or more dividers to partition the volume within drawer 924.

In an illustrative example, drawer 925 may be 329 mm wide, 310 mm tall, and 285 mm deep. In a further illustrative example, drawer 924 may be configured to store pots, tall cookware, a water kettle, and any other suitable equipment, and may include one or more dividers to partition the volume within drawer 925.

Figure 10:
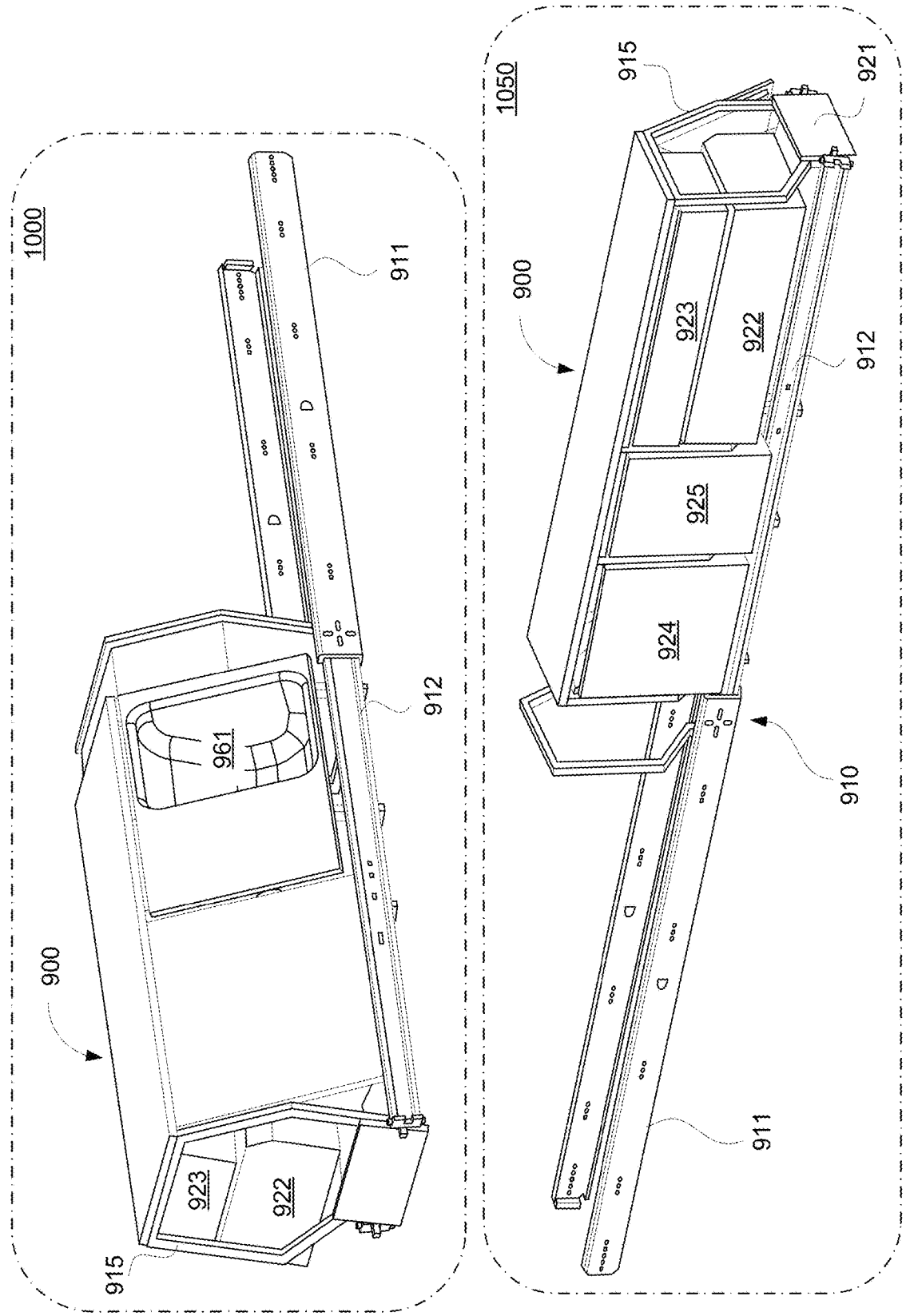
FIG. 10 shows two top perspective views of the illustrative kitchen module of FIG. 9 with the rail system extended, in accordance with some embodiments of the present disclosure.

FIG. 10 shows top perspective views 1000 and 1050 of illustrative kitchen module 900 of FIG. 9 with rail system 910 extended, in accordance with some embodiments of the present disclosure. As illustrated in FIG. 10, rail members 912 of rail system 910 are configured to slide relative to rail members 911 (e.g., which are affixed to the vehicle) and are affixed to frame system 915 of kitchen module 900 (e.g., illustrated as uncovered). This allows for more storage space but may be less appealing to the user or may allow dirt, water, or grit to get into the rails. Exposed slides (e.g., rail members 912 affixed to frame system 915) may be preferred in some circumstances. A rail system may include any suitable rail type, and may include wheel bearings, slide bushings, telescoping components, any other suitable components for allowing linear motion of a kitchen module, or any combination thereof.

Figure 11:
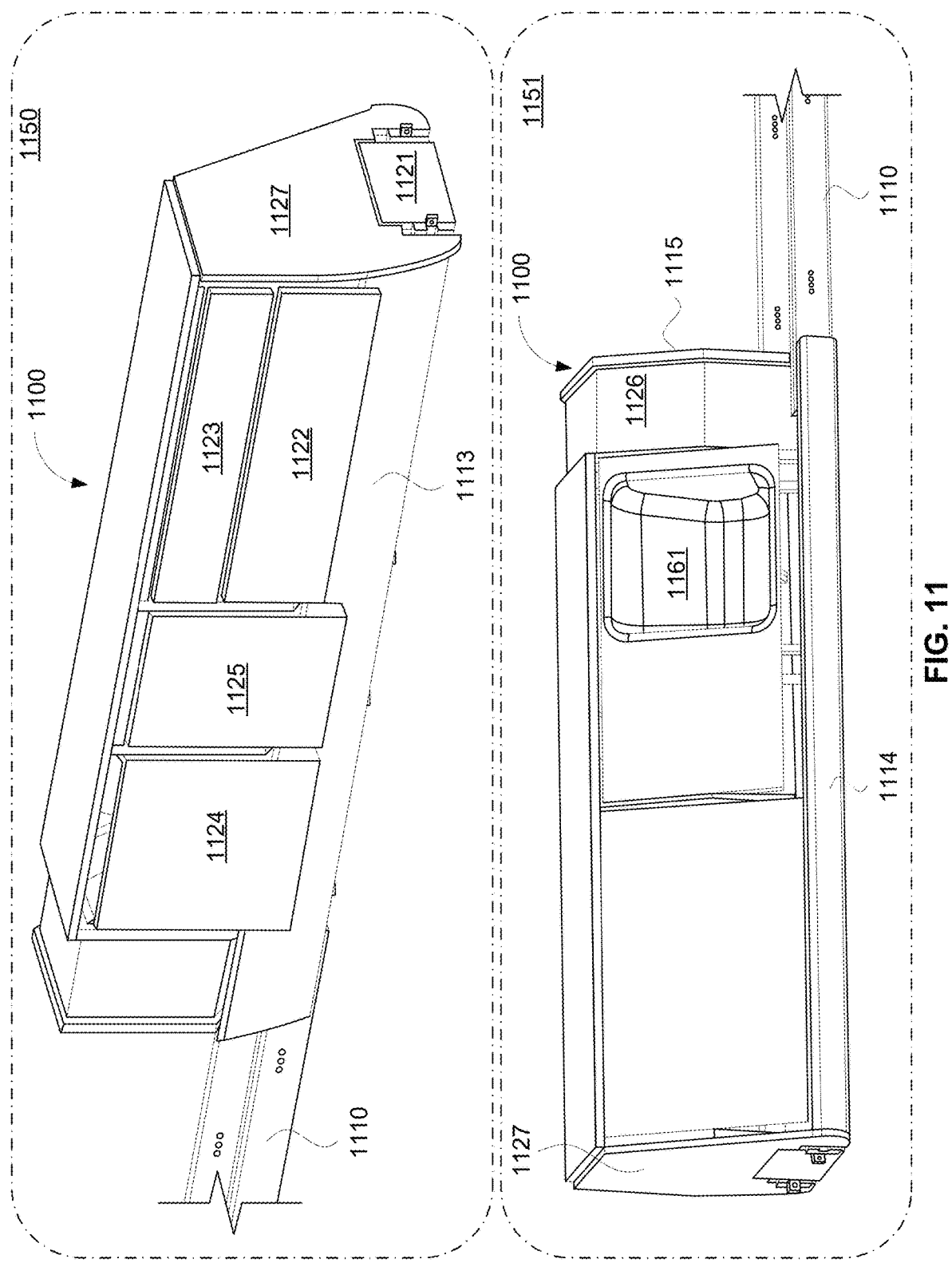
FIG. 11 shows two top perspective views of an illustrative kitchen module with the rail system extended, in accordance with some embodiments of the present disclosure.

FIG. 11 shows top perspective views 1150 and 1151 of illustrative kitchen module 1100 with rail system 1110 extended, in accordance with some embodiments of the present disclosure. As illustrated in FIG. 11, rail members of rail system 1110 that are affixed to frame system 1115 of kitchen module 1100 are covered (e.g., by covers 1113 and 1114 as illustrated). This allows for protection against dirt, water, or grit to getting into the rails, although storage space may be reduced. Covered slides may be preferred in some circumstances (e.g., the covers may be aesthetically pleasing for a user, the covers may improve the durability of rail system 1110). As illustrated, sink 1161 is collapsed down against frame system 1115 to achieve a compact shape (e.g., to fit within a storage compartment).

As illustrated, kitchen system 1100 includes drawers 1121, 1122, 1123, 1124, and 1125, cover 1126, and end cover 1127. For example, kitchen system 1100 may be the same as kitchen system 900 of FIGS. 9-10 with some covers added.

Figure 12:
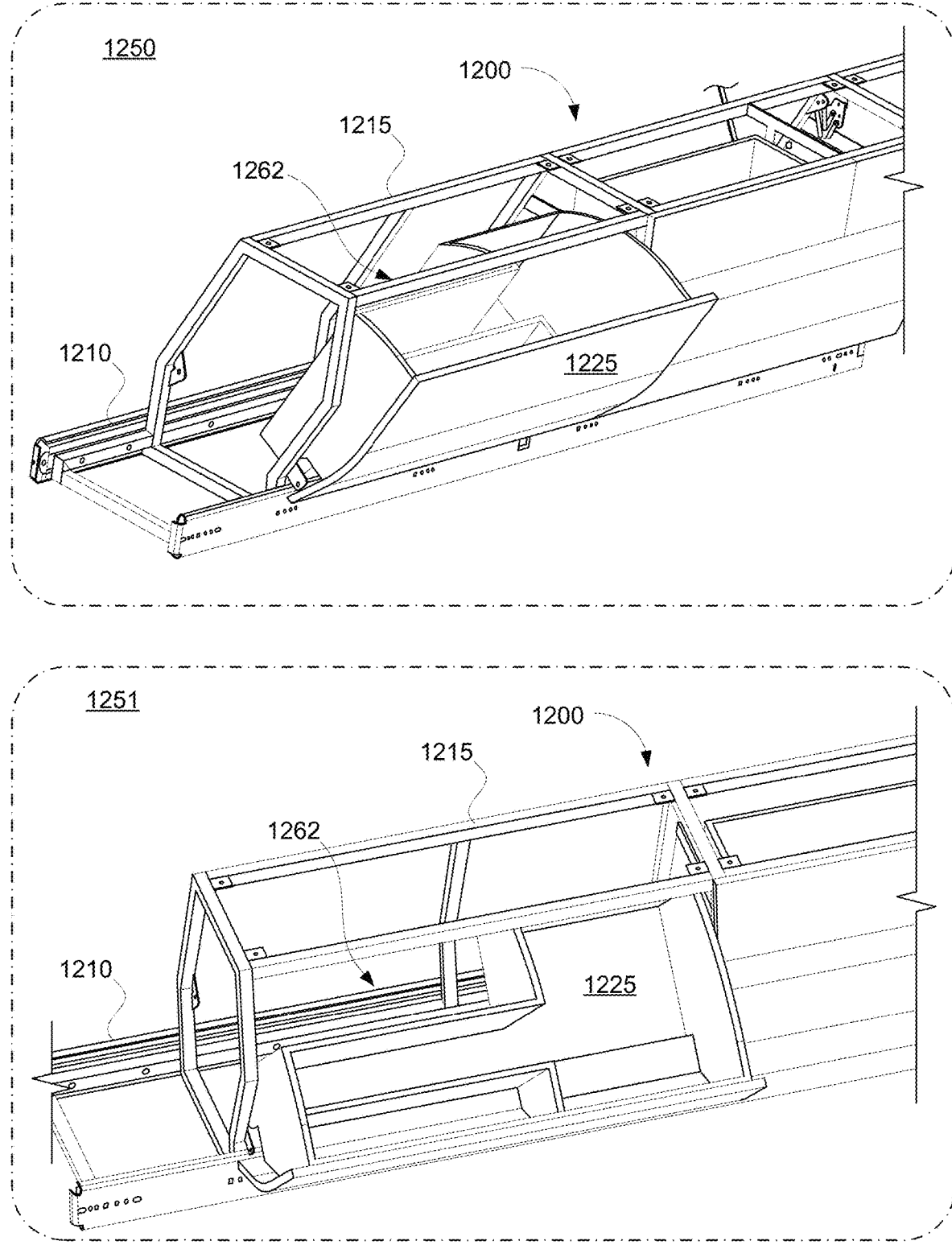
FIG. 12 shows two perspective views of a frame system with drawers of an illustrative kitchen module, in accordance with some embodiments of the present disclosure.

FIG. 12 shows perspective views 1250 and 1251 of frame system 1215 with drawers (e.g., including drawer 1225) of illustrative kitchen module 1200, in accordance with some embodiments of the present disclosure. Kitchen module 1200 includes rail system 1210, frame system 1215, and drawer 1225 (e.g., with sink recess 1262). As illustrated in FIG. 12, drawer 1225 includes sink recess 1262 configured to accommodate a sink in the folded down configuration. In some embodiments, a kitchen module includes drawers that are hinged (e.g., drawer 1225, as illustrated), on rails, or a combination thereof.

Figure 13:
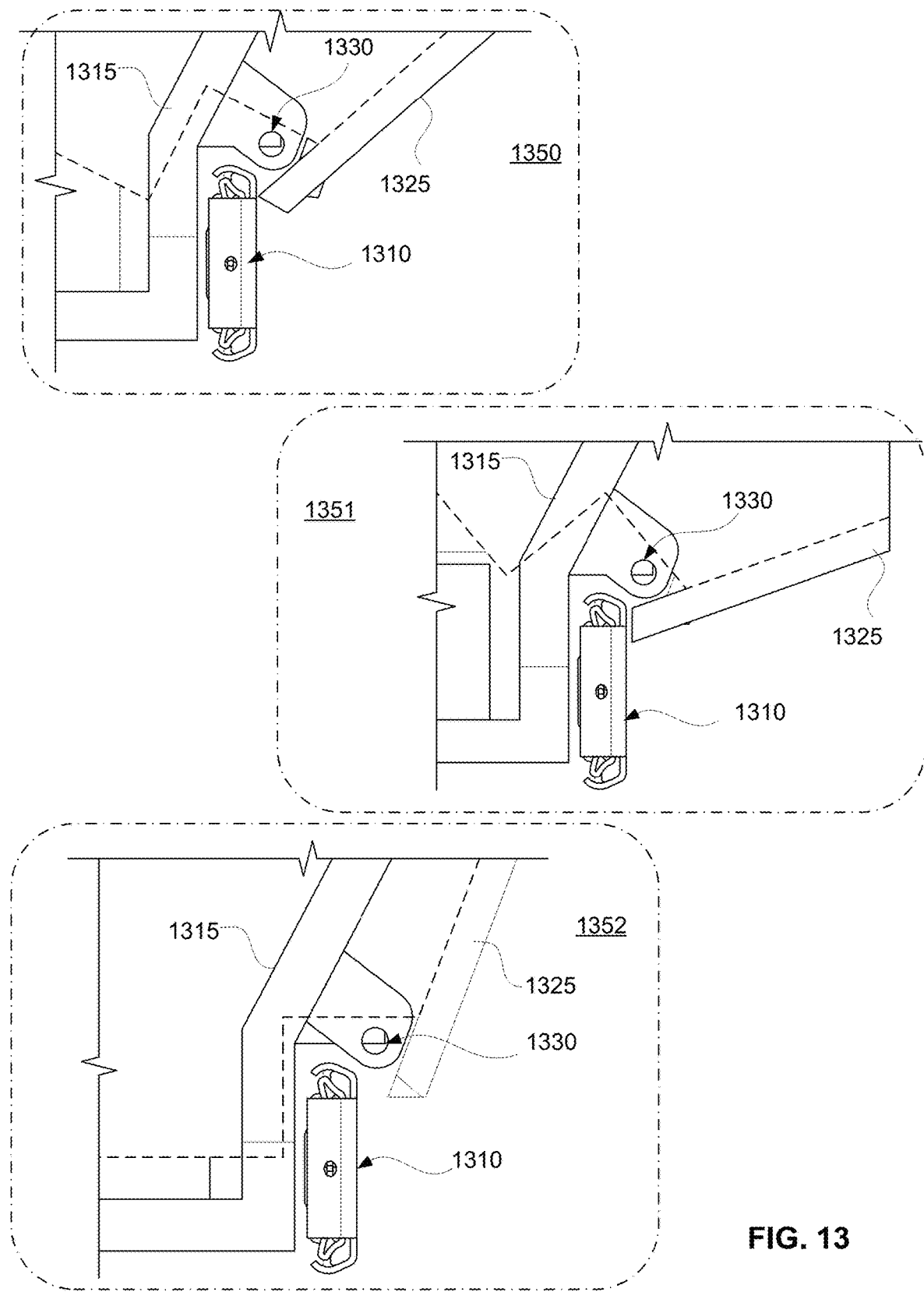
FIG. 13 shows three end views of a rail system with drawers of an illustrative kitchen module, in accordance with some embodiments of the present disclosure.

FIG. 13 shows end views 1350, 1351, and 1352 of rail system 1310 with drawers 1325 of illustrative kitchen module 1300, in accordance with some embodiments of the present disclosure. As illustrated in FIG. 13, drawer 1325 may rotate about hinge point 1330, avoiding interference with rail system 1310. For example, hinge point 1330 allows drawer 1325 to rotate relative to frame system 1315.

Figure 14:
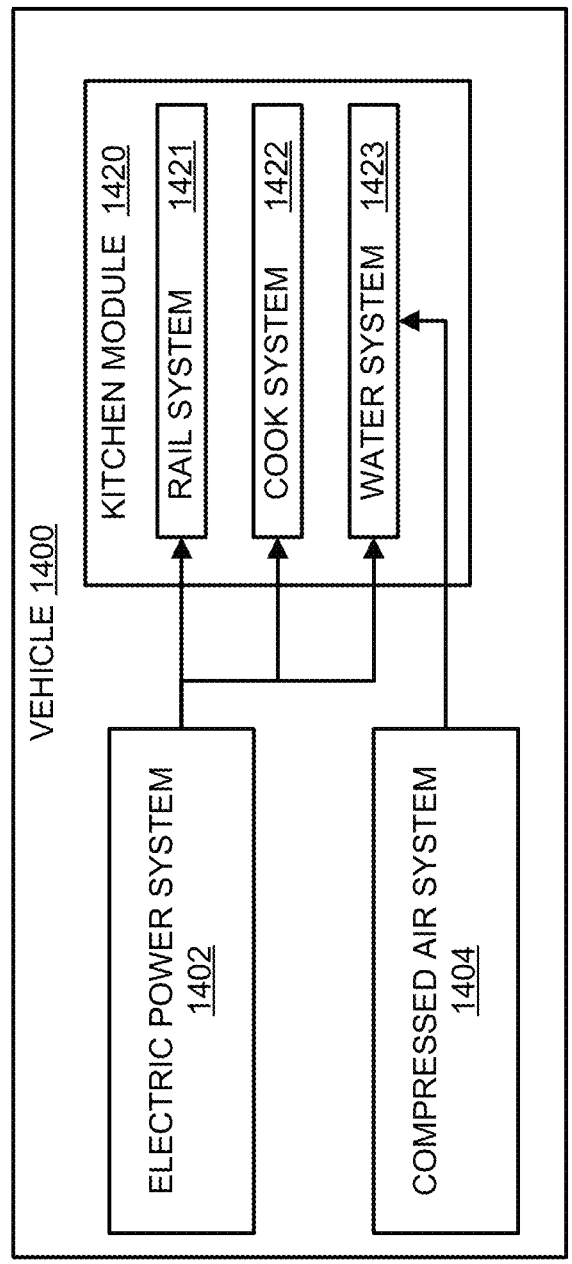
FIG. 14 shows a block diagram of an illustrative vehicle having a kitchen module, in accordance with some embodiments of the present disclosure.

FIG. 14 shows a block diagram of illustrative vehicle 1400 having a kitchen module 1420, in accordance with some embodiments of the present disclosure. Vehicle 1400 includes electric power system 1402, optionally compressed air system 1404, and kitchen module 1420. In some embodiments, vehicle 1400 is an electric vehicle. For example, vehicle 1400 may include a battery module that provides electrical energy to a motor drive train as well as auxiliary components, any other suitable modules or systems (e.g., kitchen module 1420), or a combination thereof. As illustrated in FIG. 14, kitchen module 1420 includes rail system 1421, cook system 1422, and water system 1423.

Rail system 1421 couples a frame system of kitchen module 1420 to one or more structural components or systems of vehicle 1400 (e.g., of a storage compartment). In some embodiments, rail system 1421 includes one or more actuators that are configured to apply a force or a torque to electromechanically actuate a rail mechanism. For example, the user may select a button on a key fob, button panel or dashboard control, or a soft button of a smartphone hosting a vehicle software application, to provide an indication to the electric power system to provide electrical power to the actuator. In an illustrative example, the user may press a button near an outer panel, which may provide a signal to an on-board computer of the vehicle to actuate the rail system and extend kitchen module 1400 from the storage compartment. In some embodiments, one or more electrical cables extends from the electrical power system (e.g., including control switches, fuses, or other electrical components) to an actuator of rail system 1421.

As illustrated in FIG. 14, kitchen module 1420 includes cook system 1422 that may include a rangetop having one or more "burners" that heat cooking receptacles. In some embodiments, cook system 1422 includes one or more induction cooking surfaces, one or more ohmic heating elements, or a combination thereof. In some embodiments, one or more electrical cables extends from the electrical power system (e.g., including control switches, fuses, or other electrical components) to cook system 1422. In some embodiments, cook system 1422 may include electrical components (e.g., with user-adjustable controls) for adjusting the cooking heat provided by a rangetop.

As illustrated in FIG. 14, kitchen module 1422 includes water system 1423 that provides water to a sink, manages wastewater, or both. In some embodiments, water system 1423 includes one or more tanks, one or more pumps, one or more filters, associated plumbing, faucets, drains, any other suitable components, or any combination thereof. In some embodiments, one or more electrical cables extends from the electrical power system (e.g., including control switches, fuses, or other electrical components) to water system 1423 to power one or more electric liquid pumps (e.g., that pump water to or from a sink). In some embodiments, vehicle 1400 includes an air compressor system (e.g., compressed air system 1404), and one or more compressed air lines extends from the air compressor system to water system 1423 to power one or more pneumatic liquid pumps, or to apply pressure to a tank to cause the liquid to flow. In an illustrative example, the air compressor line may be coupled to a free-board region of the tank, or to a bladder within the tank, and as compressed air flows to the tank, or bladder therein, liquid is pumped out of the tank and to a sink or other suitable dispenser.

Figure 15:
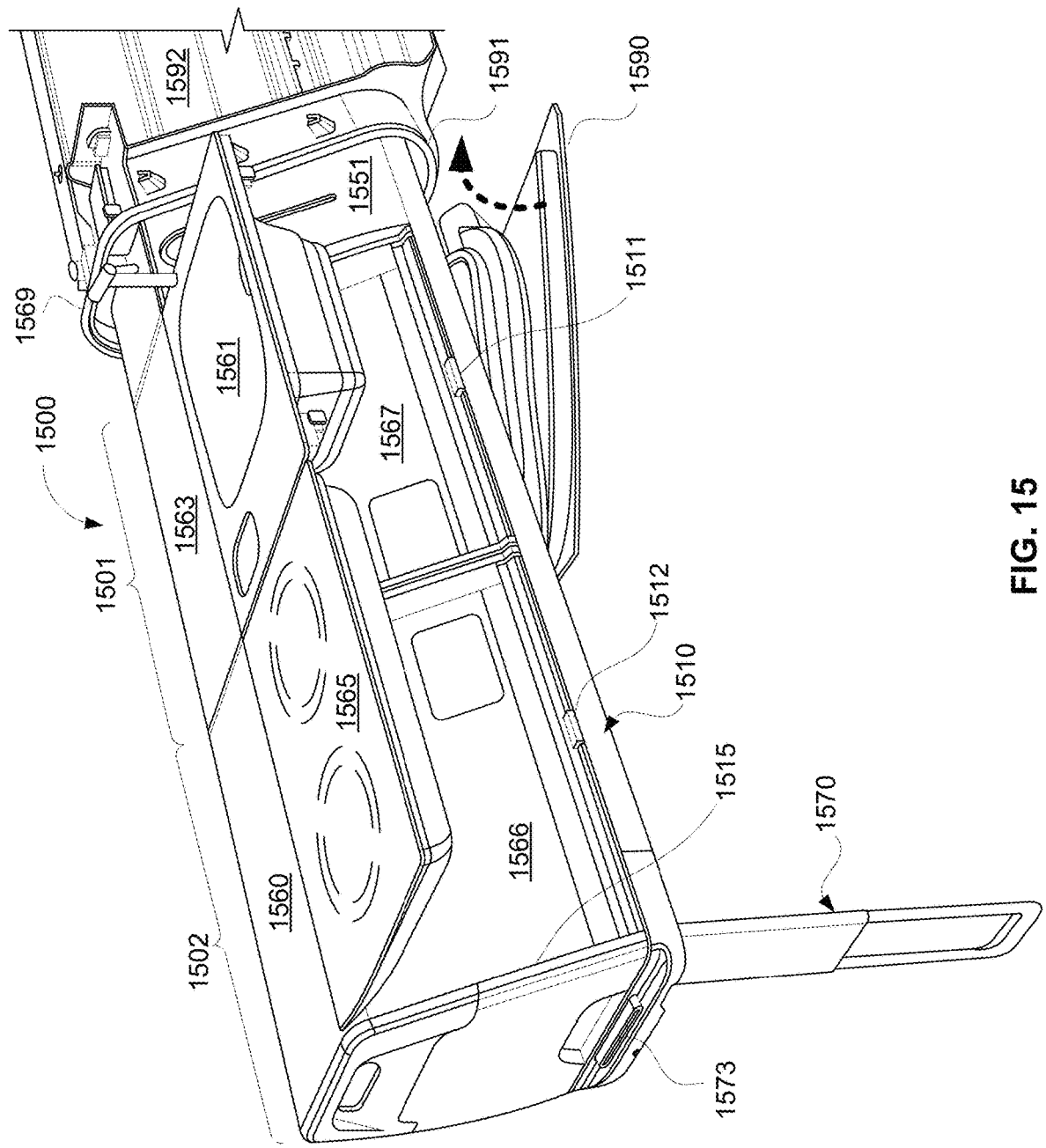
FIG. 15 shows a side perspective view of an illustrative kitchen module, pulled out from a storage compartment of a vehicle on a shuttle system, in accordance with some embodiments of the present disclosure.

FIG. 15 shows a side perspective view of illustrative kitchen module 1500, pulled out from a storage compartment of a vehicle on a shuttle, in accordance with some embodiments of the present disclosure. Kitchen module 1500 includes shuttle system 1510 (e.g., which may be a rail system or otherwise include a rail system) that affixes to the vehicle, within storage compartment 1592, allowing a linear motion of kitchen module 1500 (e.g., out of opening 1591). For example, shuttle system 1510 may include an internal rail system or a rail system mounted on the underside of the horizontal portion of shuttle system 1510. In some embodiments, kitchen module 1500 includes shuttle system 1510, with submodule 1501 and submodule 1502. As illustrated, submodule 1501 is a sink submodule with faucet 1569, countertop 1563, and sink recess 1567 (e.g., for accommodating sink 1561, when sink 1561 is collapsed or folded down either as a rigid body or as a flexible component). As illustrated, submodule 1502 is a rangetop module with rangetop 1565, countertop 1560, and rangetop recess 1566 (e.g., for accommodating rangetop 1565, when rangetop 1565 is collapsed or folded down). For example, submodules 1501 and 1502 may be removable, swappable, or otherwise separate from shuttle system 1510. In a further example, submodules 1501 and 1502 may be connected to shuttle system 1510 (e.g., as needed) via a latching system (e.g., respective latches 1511 and 1512), for storage in storage compartment 1592 or after shuttle system 1510 is extended out of storage compartment 1592. In some embodiments, kitchen module 1500 is a factory-installed option (e.g., pre-assembled with a shuttle system and submodules). In some embodiments, kitchen module 1500 is an aftermarket option (e.g., the shuttle system and/or submodules are provided separately for assembly). To illustrate, a user may pull out kitchen module 1500, or shuttle system 1510 (e.g., if no submodules are installed) from storage compartment 1592, through opening 1591, by applying a force on kitchen module 1500, or shuttle system 1510. Kitchen module 1500, as illustrated, includes water tank 1551 (e.g., which may itself be a submodule that may be connected to shuttle system 1510), and plumbing corresponding to water tank 1551. As illustrated, cover 1590, which include part of the vehicle exterior, folds as shown by the dotted arrow in FIG. 15. In some embodiments, when cover 1590 is folded down to substantially horizontal (as illustrated), kitchen module 1500, or shuttle system 1510 thereof, may rest on the inside face of cover 1590. For example, cover 1590 may support at least some of the weight of kitchen module 1500, when extended.

As illustrated, shuttle system 1510 includes leg 1570. Leg 1570 is configured to support at least some weight of kitchen module 1500 when extended. For example, kitchen module 1500 may be cantilevered when extended from storage compartment 1592, and leg 1570 may reduce the loading on the near-vehicle portion of kitchen module 1500. In a further example, the weight of kitchen module 1500, and any user-applied forces, may be supported by leg 1570, cover 1590, a portion of a rail system or shuttle system 1510, or a combination thereof. In some embodiments, leg 1570 is telescoping in the vertical direction (e.g., such that it is shortened when stowed or folded). In some embodiments, leg 1570 is foldable or otherwise collapsible (e.g., against the bottom of the horizontal portion of shuttle system 1510. As illustrated, mechanism 1573 (e.g., a handle shaped button that, when pressed, releases shuttle system 1510 to move, as illustrated) locks and releases shuttle system 1510 along its access of travel. For example, shuttle system 1510 may include one or more detents that provide stable positions (e.g., lock every six inches). Further details of shuttle system 1510 are provided in the context of FIGS. 16-17. In an illustrative example, any of the kitchen modules of the present disclosure may include a rail system, a shuttle system, or a combination thereof.

Submodules may include any suitable shape, in accordance with the present disclosure. For example, in some embodiments, a submodule may be tapered, narrowing at the top and widening at the bottom to fit in a corresponding storage compartment (e.g., to maximize use of the space between a cargo bed and rear seat). In a further example, in some embodiments, a submodule may be slanted, having a fixed width but following a slanted or curved path (e.g., slanted or curved from vertical in the front-back axis of the vehicle) to fit in a corresponding storage compartment (e.g., to maximize use of the space between a cargo bed and rear seat). In addition, submodules 1501 and 1502 are merely illustrative and any other types of submodules may be used in accordance with the present disclosure. For example, a cooler or refrigerator submodule may be provided as part of kitchen module 1500. In some embodiments, the submodules are interchangeable, and the particular submodules selected or used as part of kitchen module 1500 can be selected by the user.

Figure 16:
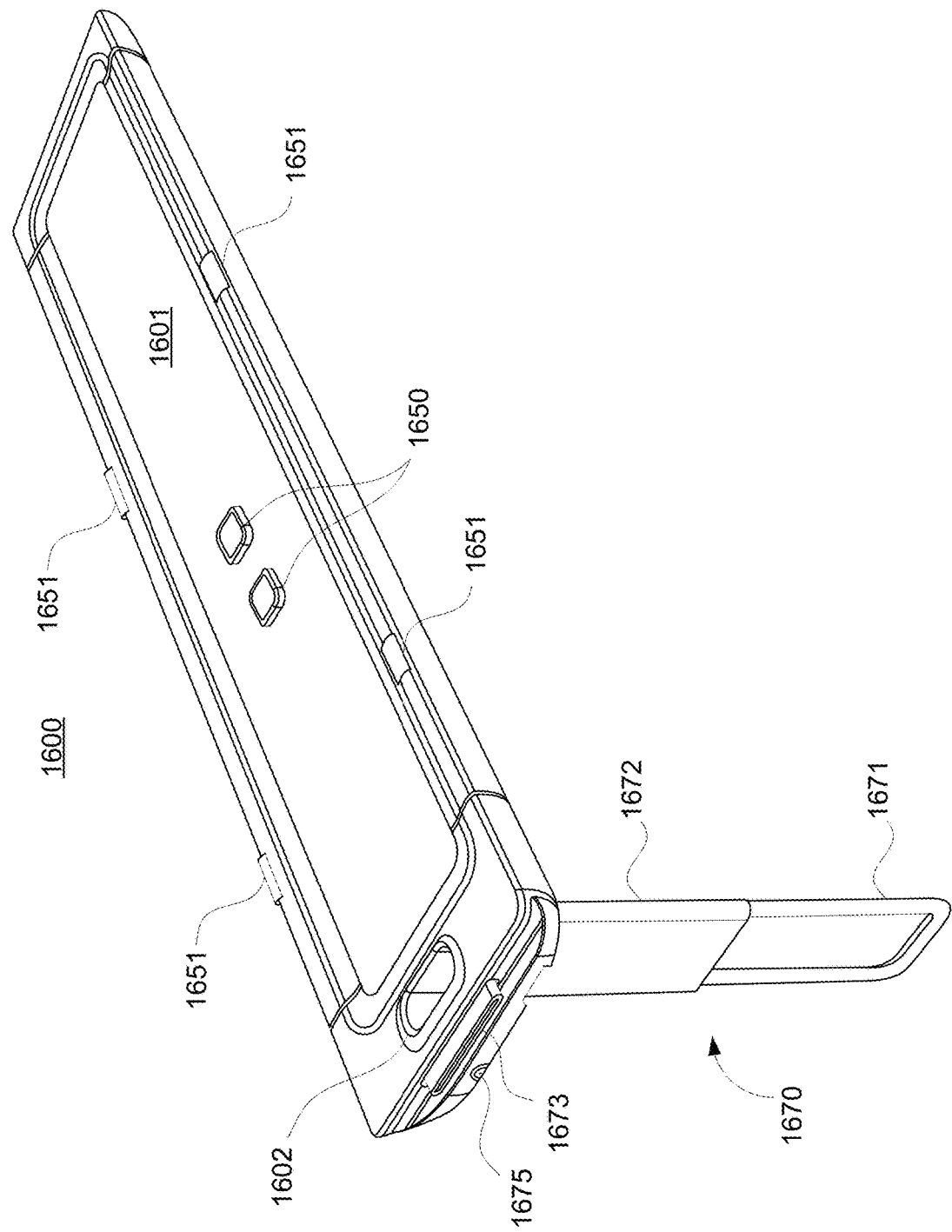
FIG. 16 shows a side perspective view of an illustrative shuttle system, in accordance with some embodiments of the present disclosure.
Figure 17:
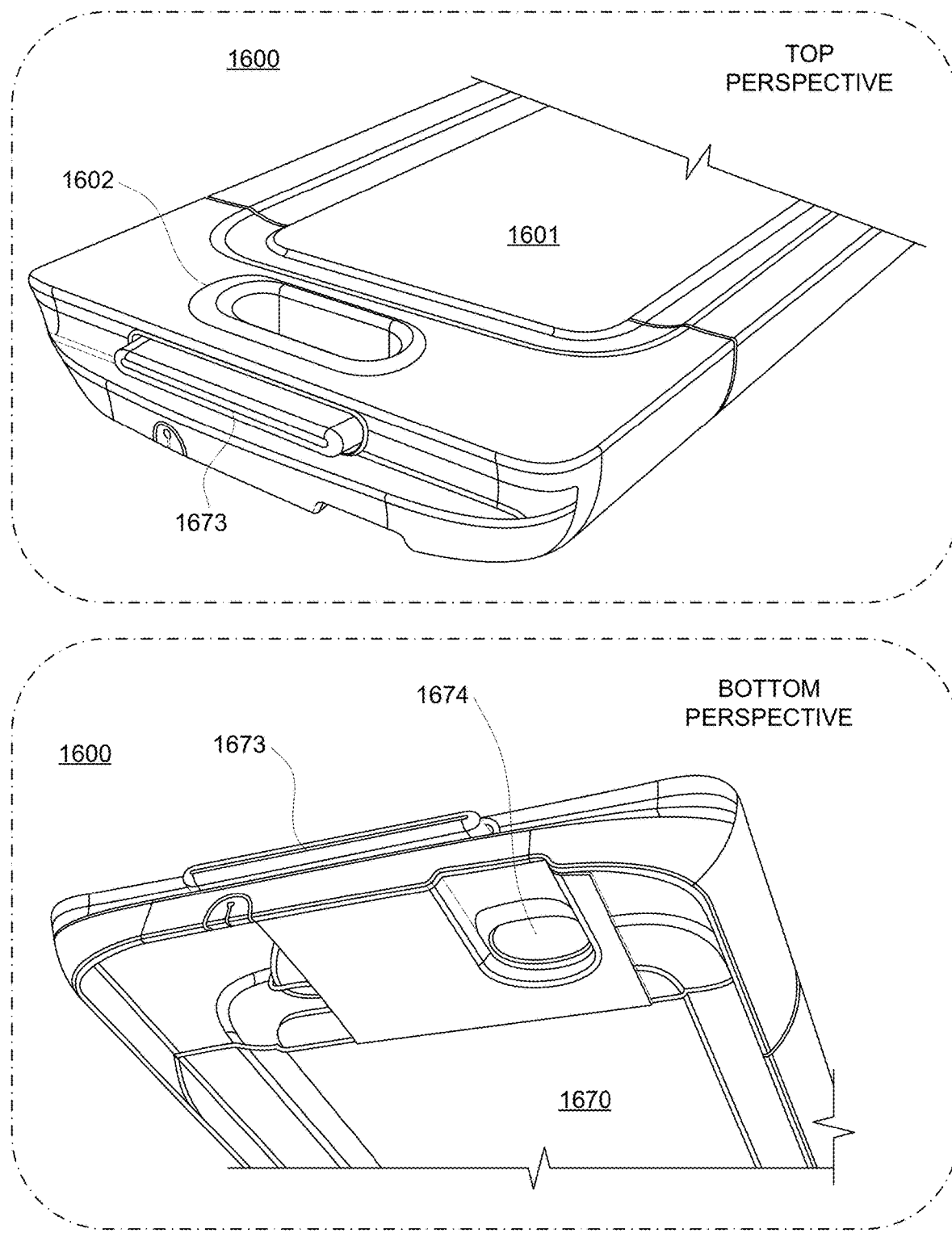
FIG. 17 shows a top perspective view and bottom perspective view of the outside end of the illustrative shuttle system of FIG. 16, in accordance with some embodiments of the present disclosure.

FIG. 16 shows a side perspective view of illustrative shuttle system 1600, in accordance with some embodiments of the present disclosure. FIG. 17 shows a top perspective view and bottom perspective view of the outside end of the illustrative shuttle system of FIG. 16, in accordance with some embodiments of the present disclosure. As illustrated, shuttle system 1600 includes leg 1670 (e.g., telescoping members 1671 and 1672), platform 1601, latches 1651, connectors 1650, handle 1602, release mechanism 1673, and release mechanism 1674. As illustrated, shuttle system 1600 includes through feature 1675 (e.g., for clearing a striker or other feature of a cover such as cover 1590 of FIG. 15), which may include a flexible rubber sheathing. Members 1671 and 1672 of leg 1670 are configured to extend and retract relative to each other, and may include one or more position detents. Leg 1670 is configured to fold up to the underside of platform 1601 when release mechanism 1674 is pulled. In some embodiments, release mechanism 1674 may include a ratchet or other detent to define one or more positions. When release mechanism 1673 is depressed, shuttle system 1600 may be retracted or extended from a storage compartment (e.g., fully or partially). A user may apply force to handle 1602 to pull or push shuttle system 1600 (e.g., for extending or retracting). In an illustrative example, any of the illustrative kitchen modules of the present disclosure may include one or more handles. In some embodiments, platform 1601 slides along grooves of a storage compartment to allow extension and retraction. In some embodiments, platform 1601 includes a rail system that allows platform 1601 to be extended and retracted from a storage compartment. In some embodiments, a shuttle system may include one or more stationary components connected to the vehicle (e.g., bolted into the storage compartment). In some embodiments, shuttle system 1600 includes or interfaces to a stationary component that remains in a storage compartment. For example, the stationary component may be coupled to an electrical system, a fluid system, or both to provide functionality to shuttle system 1600. In some embodiments, shuttle system 1600 may include a track system or conduit configured to provide electrical power or other resource to a kitchen module.

Latches 1651 are configured to secure and release submodules from platform 1601. Latches 1651 may be manually operated (e.g., handle levers or other suitable mechanisms), automatically operated (e.g., cinching actuators or electromechanical latches), controlled by a user, a control system, or a combination thereof. A shuttle system may include any suitable number of latches, arranged in any suitable configuration.

Connectors 1650 may include electrical connectors, fittings (e.g., for water, coolant, air, or other suitable fluid), or a combination thereof. For example, in some embodiments, connectors 1650 include electrical terminals configured to provide or receive 12 VDC, 120 VAC, sensor signals, control signals, electrical power or signals at any other suitable voltage or character, or any combination thereof. To illustrate, connectors 1650 may include a plastic with one or more alignment features to align to corresponding features of a submodule. To further illustrate, a submodule may include a mating connector that mates to one or more of connectors 1650 to couple an electrical system, fluid system, any other suitable system, or any combination thereof of a submodule to an interfacing system of the shuttle system (e.g., and vehicle). A shuttle system may include any suitable number of connectors, for coupling any suitable systems, arranged in any suitable configuration. In some embodiments, connectors 1650 need not engage with mating connectors when a submodule is installed. For example, in some embodiments, a submodule may, but need not, cover connectors 1650. In a further example, a user may engage a mating connector to one or more of connectors 1650 (e.g., a submodule may allow access to connectors 1650 when installed).

In an illustrative example, a rail system or shuttle system may be manually operated, automatically operated, or a combination thereof. For example, in some embodiments, a user may push and pull a portion of the rail system or shuttle system to retract or extend the system. In a further example, a user may push a button or otherwise provide an indication (e.g., on a key fob or touchscreen) to cause an actuator to retract or extend the rail system or shuttle system.

In an illustrative example, in some embodiments, a storage compartment may include an opening on each side of the vehicle, and accordingly, a kitchen module (or rail system or shuttle system thereof) may be extended from either side of the vehicle (e.g., the storage compartment may include two covers, and be a through recess in the vehicle. For example, a shuttle system (e.g., including a two-way travel rail system) may include a release mechanism and handle on each side such that it may be pulled and retracted from either side.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A kitchen module comprising:
a frame;
a rail configured to allow the frame to extend laterally along an angled sidewall of a storage compartment of a vehicle; and
a plurality of components mounted to the frame, wherein:
the frame comprises a cross-sectional shape comprising a slanted side that aligns with the angled sidewall, and
at least one component of the plurality of components is collapsible into the frame.

2. The kitchen module of claim 1, wherein the plurality of components comprise at least one of:
a sink;
a potable water tank;
a rangetop;
at least one drawer; or
a countertop.

3. The kitchen module of claim 2, wherein the sink is coupled by a plumbing system to the potable water tank.

4. The kitchen module of claim 2, wherein:
the rail is a first rail;
the kitchen module further comprises a second rail; and
the at least one drawer comprises an end drawer arranged between the first rail and the second rail.

5. The kitchen module of claim 2, wherein the countertop comprises at least one section that is removable.

6. The kitchen module of claim 2, wherein the countertop comprises at least two parts coupled by a hinge, wherein the at least two parts can rotate relative to one another.

7. The kitchen module of claim 2, wherein the at least one drawer comprises a recess to accommodate another component.

8. The kitchen module of claim 2, wherein:
the rail is a first rail;
the kitchen module further comprises at least one other rail;

the first rail and the at least one other rail are arranged to slide relative to each other, allowing motion of the frame; and the kitchen module further comprises a leg configured to support at least some of the kitchen module.

9. A kitchen module for a vehicle, the kitchen module comprising:
- a frame comprising a cross-sectional shaped comprising a slanted side that aligns with an angled sidewall of a storage compartment of the vehicle;
- a rail connected to the frame and capable of being connected to the vehicle, wherein the rail allows the frame to extend laterally along the angled sidewall; and
- a plurality of components mounted to the frame and configured to be folded the slanted side of the frame when stored in the storage compartment.

10. A vehicle comprising:
- a storage compartment comprising an angled sidewall; and
- a kitchen module comprising:
  - a frame comprising a cross-sectional shape comprised of a slanted side that aligns with the angled sidewall,
  - a rail affixed to the frame and the vehicle, configured to allow the frame to move relative to the vehicle, and
  - a plurality of components mounted to the frame;
  - wherein the rail is affixed to a surface of the storage compartment, and wherein the kitchen module is arranged to be extended from and retracted into the storage compartment.

11. The vehicle of claim 10, further comprising an electrical extension connecting an electric power source of the vehicle to the kitchen module.

12. The vehicle of claim 11, wherein the vehicle comprises an electric vehicle and wherein the electric power source of the vehicle comprises a battery module that also provides power to an electric drivetrain of the vehicle.

13. The vehicle of claim 11, wherein the electrical extension is coupled to at least one of an actuator of the rail and a rangetop.

14. The vehicle of claim 10, further comprising an air compression extension connecting an air compressor system of the vehicle to the kitchen module.

15. The vehicle of claim 10, wherein the vehicle further comprises an outer panel that is arranged to be part of the vehicle exterior when the kitchen module is retracted into the storage compartment.

16. The vehicle of claim 10, further comprising:
- an occupant compartment; and
- a cargo bed, wherein the storage compartment is arranged between an occupant compartment and a carbo bed.

17. The vehicle of claim 10, wherein the kitchen module comprises at least one of:
- a sink;
- a potable water tank;
- a rangetop;
- at least one drawer; or
- a countertop.

18. The vehicle of claim 10, wherein the kitchen module comprises a sink and a potable water tank, and wherein the sink is coupled by a plumbing system to the potable water tank.

19. The vehicle of claim 10, further comprising a countertop that folds out to form a horizontal surface.

20. The vehicle of claim 10, further comprising an exterior body surface comprising an opening, wherein the storage compartment is within the opening.

* * * * *